March 15, 1966 S. BORASO ET AL 3,240,211

DISK-TYPE THRESHING DEVICE

Filed Oct. 17, 1963

INVENTORS
SEVERINO BORASO
DANILO BRAGANTE

BY Paul M. Craig, Jr.

ATTORNEY

United States Patent Office 3,240,211
Patented Mar. 15, 1966

3,240,211
DISK-TYPE THRESHING DEVICE
Severino Boraso and Danilo Bragante, both of
26 Via Schiavin, Este, Padova, Italy
Filed Oct. 17, 1963, Ser. No. 316,927
Claims priority, application Italy, Oct. 26, 1962,
21,058/62
1 Claim. (Cl. 130—30)

The present invention relates to a threshing machine, and in particular to a threshing machine in which the cereal or seeds are threshed between two spaced disk-like members.

Threshing machines for grain and seeds in use at present effectuate the shelling or husking of the grain or seeds from the husks by means of a creeping and stripping movement of the stems of the cereal or seed plants between a horizontal cylindrical beater and an indented cylindrical surface, which is also disposed horizontally.

In order to increase the productive capacity thereof and simultaneously to obtain smaller dimensions and reduce encumbrance and weight, the threshing machine in accordance with the present invention is characterized in that the shelling or husking is carried out between a pair of disk-like members which operate in the vertical direction, that is, with the shafts extending substantially horizontally.

The underlying principle of the present invention consists in realizing the shelling or husking by means of a pair of disk-like members, which are preferably conical, one of which is stationary and is provided with notched or indented threshing bars, while the other disk is rotatable and is provided with radial ribs or threshing bars.

When introducing or feeding the grain to be threshed between these two disk-like elements and by appropriately regulating the distance of these elements, the shelling or husking is realized within a relatively short angular movement so that, in the threshing machines according to the present invention with a relatively larger diameter, two feeds may be made simultaneously on diametrically opposite sides of the threshing machine in accordance with the present invention.

This pair of disk-like members is arranged at the front end of a sturdy frame on the inside of which is disposed a cylindrical cover or housing provided with window-like openings or with small bores for the passage of the grain or seeds, and within which rotates a shaft provided with blades for transporting the straw or chaff which is discharged to the outside.

Accordingly, it is an object of the present invention to provide a threshing machine which assures increased productivity and improved efficiency as compared to prior art threshing devices of the same size.

Another object of the present invention resides in the provision of a threshing machine which permits increase in the productive capacity accompanied with smaller dimensions and lesser weight of the installation.

A still further object of the present invention resides in the provision of a threshing machine in which the threshing operation is realized over a relatively short angular distance of the threshing members.

A further object of the present invention resides in the provision of a threshing machine which permits a plurality of simultaneous feeds of the material to be threshed into the threshing machine.

A still further object of the present invention resides in the provision of a threshing machine offering improved performance by extremely simple means that involve no large expenditures and which may be readily accommodated within a compact machine.

These and other objects, features and advantages of the present invention will become more obvious from the following description, when taken in connection with the accompanying drawing, which shows, for purposes of illustration only, one embodiment in accordance with the present invention, and wherein FIGURE 1 is a longitudinal cross-sectional view through the threshing machine in accordance with the present invention;

Figure 4:
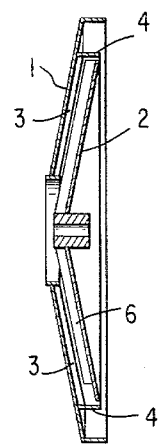
Figure 5:
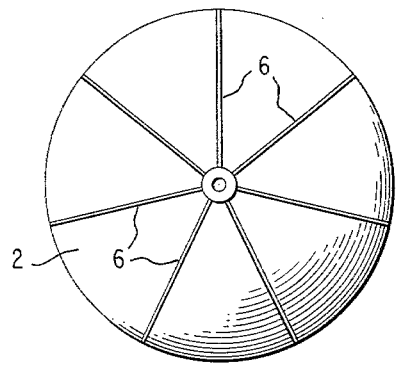

FIGURE 4 is a cross sectional view through the threshing section of the machine according to the present invention showing the nested relationship of the movable and stationary disk-like members of the threshing device according to the present invention, and FIGURE 5 is an elevational front view of the movable disk-like plate member of the threshing device in accordance with the present invention, to be referred to hereinafter as beating means.

Figure 1:
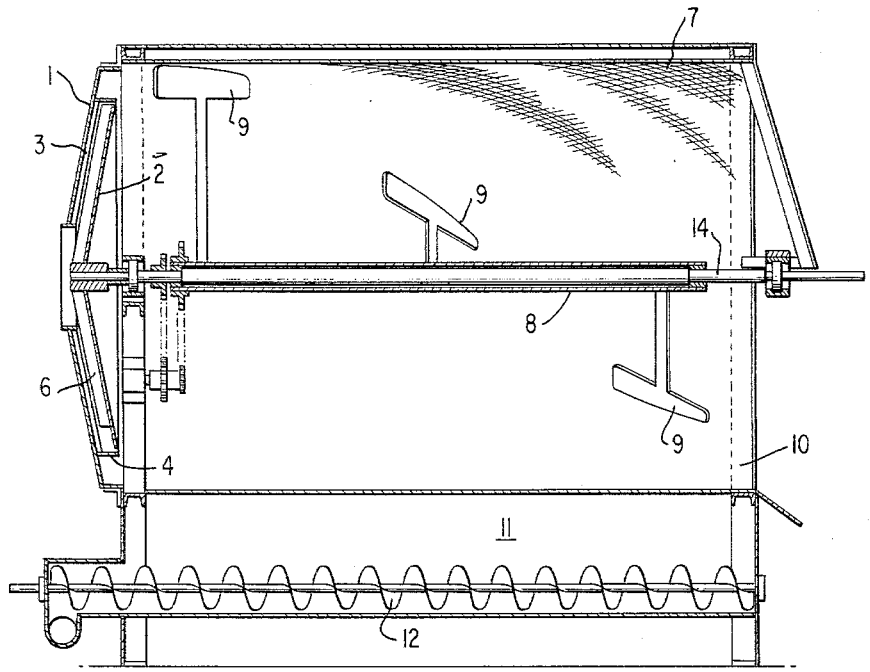

Referring now to the drawing, wherein like reference numerals are used throughout the various views to designate like parts, and more particularly to FIGURE 1, reference numerals 1 and 2 designate therein two disk-like plate members, which are preferably of conical shape.

Of these two plate members, plate 1 is stationary and constitutes the front end cover of the threshing device. The plate member 1 is provided on the inside thereof with a plurality of notched or indented, radially-disposed threshing bars 3.

Figure 2:
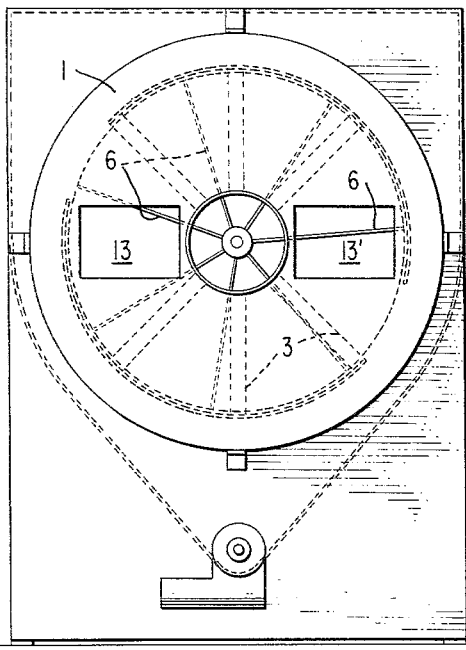
FIGURE 2 is an end elevational view of the threshing machine according to the present invention, showing in dash lines the kinematic connections together with the internal parts.
Figure 3:
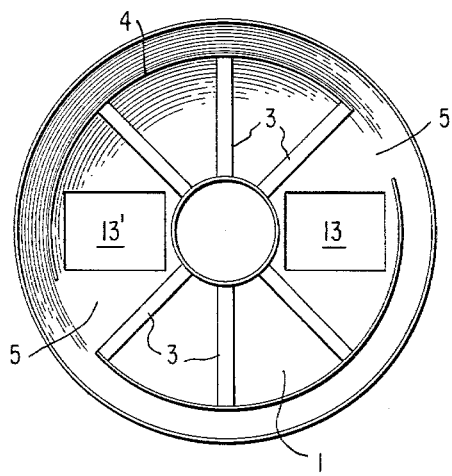
FIGURE 3 is a rear elevational view of the stationary disk-like plate member of the threshing device in accordance with the present invention, to be referred to hereinafter as counter-beating means.

In the illustrated embodiment which relates to a threshing machine with two inlet apertures 13, 13' (FIGURES 2 and 3), there are secured to the extreme end of the bars 3 two circular sheet metal aprons or guide means 4 which prevent the material to be threshed from falling out of the threshing section.

The interruptions or spaces 5 left free between the two pairs of aprons or guide means 4 constitute the outlet or discharge zone for the threshed material.

The movable disk-like plate member 2 is provided with an appropriate set of bars or ribs 6 intended to press the material to be threshed against the notched or indented bars 3.

The exact location and arrangement of the pair of disk-like plate members and parts thereof is clearly shown in FIGURE 4.

A shaft 8 is rotatably supported within the cylindrical body or housing 7, which shaft 8 is coaxial with but independent of the driving shaft 14 which actuates the rotary disk-like member 2. Blades 9 are suitably supported on shaft 8 which thrust or push the threshed material to the outside, such material being discharged through the rear aperture 10 (FIGURE 1) of the threshing machine.

The cylindrical body or housing 7 includes an envelope or covering which is provided with small window-like apertures or bores so that any seeds or grains which could possibly still be attached to the straw or chaff may pass over into the collector 11 in which the grain or seeds threshed by the two disk-like members 1 and 2 have already been collected.

A worm or screw conveyor 12 provides for the transport of the grain or seed.

It is evident that the machine in accordance with the present invention may be utilized either alone or in conjunction with a reaper or mowing machine, thus becoming a combination reaper-thresher or mower-thresher and may be connected also to the baler for the chaff or straw which is discharged therefrom. It is also understood that the machine in accordance with the present invention may serve for separating, shelling or husking any type of grain or seed of any kind.

*Operation*

The threshing machine in accordance with the present invention operates as follows:

The material to be threshed is introduced through the openings 13 and 13' and is thereupon seized or gripped by the bars 6 provided on the disk-like member 2 which rotate in a clockwise direction. The material thus seized is thereupon conducted against the intended cross bars 3 in such a manner as to separate the grain from the straw or chaff. The aprons 5 retain all of the material in such a manner that the straw or chaff and the grain or seeds are discharged only through the radial apertures 5 to fall into the large cylinder 7 which is provided with a large number of small holes or bores on the surface thereof. Thus, while the grain or seeds are able to pass through the small holes provided in cylinder 7 and thereby are able to fall into the collector space 11 where the screw conveyor 12 will transport the grain or seeds to the outside, the straw or chaff, on the other hand, is transported or conveyed to the outside by the rotating blades 9 through the aperture 10 and thus discharged out of the machine.

While we have shown and described one embodiment in accordance with the present invention, it is obvious that the same is not limited thereto but is susceptible of numerous changes and modifications as known to a person skilled in the art.

Thus, the machine according to the present invention also may be provided, for example, with pneumatic means of any conventional construction for transporting the grain or seed. It is equally apparent that the present invention is independent of its size and of the number of apertures, of indented bars, of ribs in the movable disk-like member and of the kinematic means employed for setting the movable parts of the machine into rotation as well as of the desired number of revolutions, and is also independent of the particular driving motor used.

Thus, it is obvious that the present invention is not limited to the illustrated details shown and described herein but may be modified in numerous ways without departing from the scope thereof, and we, therefore, do not wish to be limited to the details shown and described herein but intend to cover all such changes and modifications as are encompassed by the scope of the appended claims.

We claim:

A threshing machine for grain and various seeds having a support structure forming a housing, comprising:

a first relatively stationary disk-like member secured to said support structure and forming one end face of said machine, a second relatively rotatable disk-like member rotatably supported on said support structure, said two disk-like members being of such complementary shape as to define therebetween a threshing space with the axes thereof disposed approximately horizontally, said first disk-like member being provided with radially disposed threshing bars on the side facing said second disk-like member, and said second disk-like member being provided with substantially radially disposed bars on the side facing said first disk-like member, aperture means in said first disk-like member for feeding the material to be threshed into said space substantially in the axial direction thereof and interrupted guide means on said first disk-like member secured to the outer ends of said radially disposed threshing bars for containing the material during the threshing operation in such a manner that it can be discharged only through the interruptions of guide means, means rotatably mounted within said housing for discharging the chaff from the machine at the end substantially opposite said disk-like members with the axis of said rotatable means being concentric with said axes, means for rotating said last-mentioned means and said second disk-like member independently of one another, and means for collecting the grain and seeds in the bottom of said housing.

References Cited by the Examiner

UNITED STATES PATENTS

| | | | |
|---|---|---|---|
| 390,125 | 9/1888 | Travers et al. | 130—30 |
| 1,232,064 | 7/1917 | Maull | 130—30 |
| 2,320,557 | 6/1943 | Betzen | 130—27.12 |
| 2,974,668 | 3/1961 | Witzel | 130—27.12 |

FOREIGN PATENTS

| | | |
|---|---|---|
| 144,633 | 1/1952 | Australia. |
| 864,770 | 1/1953 | Germany. |
| 203,141 | 9/1923 | Great Britain. |

ABRAHAM G. STONE, *Primary Examiner.*

ANTONIO F. GUIDA, T. GRAHAM CRAVER,
*Examiners.*

J. O. BOLT, *Assistant Examiner.*